May 20, 1958     F. L. KINGSBURY     2,835,568
METHOD OF PRODUCING TITANIUM
Filed Nov. 20, 1952
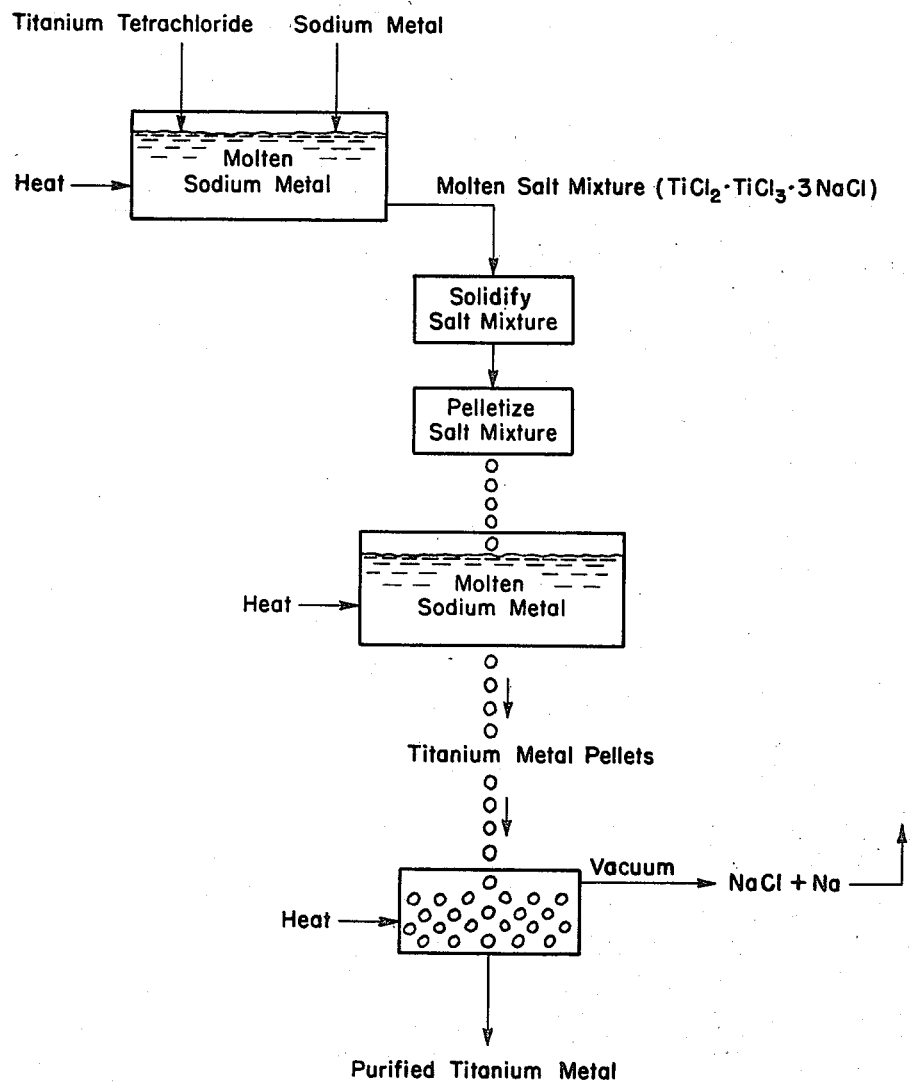
INVENTOR
Franklin L. Kingsbury
BY
Charles F. Kaegebeh
ATTORNEY United States Patent Office 2,835,568
Patented May 20, 1958

2,835,568

METHOD OF PRODUCING TITANIUM

Franklin L. Kingsbury, New Brunswick, N. J., assignor to National Lead Company, New York, N. Y., a corporation of New Jersey Application November 20, 1952, Serial No. 321,596

7 Claims. (Cl. 75—84.5)

This invention relates to a method for producing titanium metal by reacting titanium tetrachloride with a reducing metal selected from the alkali and alkaline earth metals including magnesium.

Many methods have been proposed for preparing titanium metal by reacting titanium tetrachloride with various reducing metals. Most of these processes are involved and complicated to employ and expensive to operate because of the extreme difficulties in handling the reaction products. In most of these processes the reducing metal and titanium tetrachloride are reacted in a vessel to form titanium metal and the metal chloride of the reducing metal. The products are then solidified in massive form in the reactor and removed from the reaction vessel by boring or chipping the solidified mass. These processes are uneconomical because of the excessive labor involved in handling the reaction products. The titanium metal heretofore produced by the action of reducing metals upon titanium tetrachloride has been recovered in the form of a fused reaction mass comprising titanium metal of uncontrolled particle size and shape thoroughly intermixed with chloride salt of said reducing metal and with any unreacted reducing metal. Because of the inability to control the size and shape of said titanium particles, eleborate, costly equipment and processes necessarily had to be employed in order to obtain a purified titanium metal product.

An object of this invention therefore is to provide a method wherein the reaction products obtained are handled in an easy and inexpensive manner.

Another object of this invention is to produce economically titanium metal of a controlled size and form. A further object of this invention is to provide a method wherein the titanium metal can be produced in a continuous manner. A still further object is to provide a fused intermediate product containing the titanium values which may be easily solidified into a predetermined form and stored if desired until used for production of titanium metal. These and other objects will become more apparent from the following description of the invention.

Broadly the process of this invention comprises reacting titanium tetrachloride with a reducing metal selected from the group consisting of the alkali and alkaline earth metals including magnesium to form a molten reduced titanium chloride and metal chloride salt mixture as an intermediate product, solidfying and pelletizing said salt mixture, dropping the pelleted mixture into a reducing metal selected from said group to form titanium metal therefrom in pelleted form, removing the titanium metal from said reducing metal and purifying said titanium metal. The entire operation must be carried out under an inert atmosphere or in a closed system. The process is easy to operate on a continuous or semi-continuous basis.

In order to more fully explain the process of this invention a flow sheet is presented in the figure of the drawing showing the various steps involved in producing titanium metal. As shown in the flow sheet titanium tetrachloride and a reducing metal such as sodium are added to the reactor at elevated temperature to form a molten salt mixture containing reduced titanium chloride and sodium chloride. In his particular instance the reactor originally contained 46 parts of molten sodium metal to which were added 380 parts of titanium tetrachloride and 23 parts of sodium metal.

The reaction was carried out in the presence of a mechanical agitator which thoroughly mixed the molten mass. The molten mixture contained 26.5% $TiCl_2$, 34.5% $TiCl_3$, and 39% $NaCl$ which is represented by the formula $TiCl_2 \cdot TiCl_3 \cdot 3NaCl$. The molten mixture had a temperature of 790° C.

A portion of the mixture was then solidified by pelletizing into lumps containing 200 grams.

This material when solidified may be stored under an inert atmosphere until used for the production of titanium metal. This mixture may also be used for many other purposes, such as for example, a bleaching agent in the textile industry or for a mordant in dyeing processes.

The pelletizing described above was carried out at a temperature of 100° C. The pellets were then dropped into the metallizer containing molten sodium metal and onto a conveyor which was placed below the surface of the molten sodium metal. The titanium values in the pellets were then reduced to titanium metal in the molten sodium bath at a temperature of 825° C. During the reduction of reduced titanium chlorides to metal the pellets were conveyed through the sodium metal bath and removed in lump form as a titanium metal product. The titanium metal pellets were then moved to a vacuum chamber which was heated to 1000° C. for 30 minutes to remove the adhered sodium chloride formed and the sodium metal retained on the titanium metal pellet. The purified titanium metal pellet contained about 99.6% Ti which is an exceptionally high purity. The entire process was carried out in a closed system under an inert atmosphere to prevent contamination of the titanium metal product.

In describing the process of this invention in more detail a more complete description of each step of the operation is presented as follows:

The operation is mainly divided into three distinct steps plus a final purification step. The three distinct steps are partial reduction to a reduced metal chloride salt mixture, solidification and pelletizing said mixture, and final reduction to titanium metal. In both reduction steps any one or combination of the reducing metals from the alkali and alkaline earth metals groups may be employed.

In the partial reduction step, i. e. the first step, titanium tetrachloride and a reducing metal are added to the reactor under agitation in amounts to produce either titanium trichloride or titanium dichloride or mixtures of both reduced titanium chlorides, the reducing metal thus forming a chloride in the presence of the reduced titanium chlorides to form a molten salt mixture as an intermediate product. It is necessary to carry out the reaction between the titanium tetrachloride and the reducing metal at temperatures above the melting point of the reduced titanium chloride and metal chloride mixture. In most cases it is satisfactory to carry out the reaction at temperatures above the melting point of the chlorides of the reducing metal but below the boiling point of the reducing metal. The reaction may also be carried at pressures other than atmospheric provided that the mixture of the reduced titanium chlorides and the reducing metal chloride is maintained in a molten state and the reactants are maintained in the reactor. Preferably the reducing metal should be maintained below its normal boiling point in the reactor but the reaction may be carried out at temperature above the normal boiling point of the reducing metal provided a closed system is employed. The reactions involved are not clearly understood but it is believed that the titanium tetrachloride first reacts with the reducing metal to form metal chloride and titanium metal. The titanium metal formed reacts with the excess titanium tetrachloride to form either the dichloride or trichloride of titanium. In any case the reacion proceeds in a rapid manner and it has been found that the reaction is usually complete within a few minutes.

The molten salt mixture formed in the reactor is then withdrawn from the reactor, solidified and pelletized into small lump form. One method of pelletizing the mixture is to cast the molten mass into molds which is removed when solidified.

The pellets are then introduced into the metallizer containing a molten reducing metal to complete the reduction of titanium metal. The pellets are dropped into the molten metal and onto a conveyor which moves through the reducing metal and out of the reaction zone. Temperatures in excess of the melting point of the reducing metal are satisfactory. The titanium values in the pellets are reduced to titanium metal in a rapid manner. It has been found that a retention time of 3 minutes has been satisfactory. The pellet retained its shape during reduction to titanium metal and a pellet of titanium metal is removed from the metallizer by means of the conveyor. The titanium metal pellet is then moved by the conveyor into a closed chamber and heated, preferably from 800° to 1100° C. while under pressures lower than atmospheric, to purify the pellet by removing by volatilization in an inert atmosphere the adhering unreacted reducing metal. Any reducing metal chloride adhering to the titanium metal pellets also may be removed during the volatilization step or it may be removed by a water leaching step after the reducing metal has been volatilized. Temperatures as high as about 1400° C. may be required for the volatilization step if the purification step is carried out at or about atmospheric pressure. The purifying step should preferably be carried out under vacuum. It is desirable to maintain the titanium metal pellet in the purifying zone from 20 to 60 minutes. The purified pellet is then cooled to room temperature. Titanium metal produced by this process has had a purity in excess of 99.5% Ti and has possessed a Brinell hardness of 200 or less.

In brief the improved method of this invention is characterized first by the production of a fused reduced metal chloride salt mixture which is then formed into pellets of predetermined size as an intermediate product.

The intermediate product of predetermined size is subsequently reduced further to form pellets of titanium metal which conform with and are dependent upon the predetermined size and character of the pellets of the reduced metal chloride salt mixture which were produced as the intermediate product.

By the use of this process which provides first for the formation of predetermined sized pellets of reduced metal chloride salt mixture, it is possible to obtain subsequently titanium metal in pellet form in the final reduction step. The formation of titanium metal in pellet form provides a product to be produced which is easy and economical to handle. By the use of the process of the instant invention, titanium metal can be produced in a continuous or semi-continuous manner. By the use of this invention the formation of massive size deposits of titanium metal in the reactor, which are formed by the prior art procedures, are avoided. The pelletized titanium metal product is easily removed from the reactor without using the required prior art procedures of boring and chipping the solidified titanium metal mass. The titanium metal pellets when subsequently purified are substantially free of contaminants and an exceptionally high grade titanium metal is produced.

While this invention which is a continuation-in-part of application Serial No. 178,648, filed August 10, 1950, now abandoned, has been described and illustrated by the examples shown, it is not intended to be strictly limited thereto and other modifications and variations may be employed within the scope of the following claims.

I claim:

1. Method for producing titanium metal which comprises reacting sufficient titanium tetrachloride with a molten reducing metal selected from the group consisting of the alkali metals and alkaline earth metals including magnesium, to form a molten salt mixture of reduced titanium chloride and metal chloride, said reaction being carried out at temperature above the melting point of said molten salt mixture, cooling said molten salt mixture to solidify same and pelletizing said mixture, submerging the pellets in a mass of molten reducing metal selected from said group to form titanium metal pellets, removing said titanium metal pellets from said mass, and purifying said titanium metal pellets by volatilizing said reducing metal and metal chloride adhering to said titanium metal pellets.

2. Method for producing titanium metal which comprises reacting sufficient titanium tetrachloride with a molten reducing metal selected from the group consisting of the alkali metals and alkaline earth metals including magnesium to form a molten salt mixture of reduced titanium chloride and metal chloride of said reducing metal, said reaction being carried out at temperature above the melting point of said molten salt mixture, cooling said molten salt mixture to solidfy same, and pelletizing said mixture, submerging the pellets in a mass of molten reducing metal selected from said group to form titanium metal pellets, removing said titanium metal pellets from said mass, and purifying said titanium metal pellets by volatilizing said reducing metal and metal chloride adhering to said titanium metal pellets.

3. Method for producing titanium metal which comprises reacting titanium tetrachloride with molten sodium metal to form a molten salt mixture of reduced titanium chloride and sodium chloride, said reaction being carried out at temperature above the melting point of said molten salt mixture, cooling said molten salt mixture to solidify same, and peletizing said mixture, submerging the pellets in a mass of molten sodium metal to form titanium metal pellets, and removing said titanium metal pellets from said mass, and purifying said titanium metal pellets by volatilizing said sodium metal and sodium chloride adhering to said titanium metal pellets.

4. Method for producing titanium metal which comprises reacting titanium tetrachloride with molten calcium metal to form a molten salt mixture of reduced titanium chloride and calcium chloride, said reaction being carried out at temperature above the melting point of said molten salt mixture, cooling said molten salt mixture to solidify same and pelletizing said mixture, submerging the pellets in a mass of molten sodium metal to form titanium metal pellets, removing said titanium metal pellets from said mass, and purifying said titanium metal pellets by volatilizing calcium and sodium metals and calcium and sodium chlorides adhering to said titanium metal pellets.

5. A method for producing a fused salt mixture which consists essentially of reacting titanium tetrachloride with a molten reducing metal selected from the group consisting of alkali metal, alkaline earth metal and magnesium, said titanium tetrachloride and said reducing metal introduced in stoichiometric proportions to produce a fused salt mixture containing reducing metal chloride and lower valent titanium chloride selected from the group consisting of titanium chloride, titanium dichloride and mixtures thereof, said reaction being carried out at a temperature above the melting point of said fused salt mixture.

6. In a method for producing titanium metal in which a reducing metal and a titanium compound are reacted with one another to form titanium metal and a reducing metal salt, the improvement which consists essentially of employing a fused salt mixture as the titanium compound in said reaction, said fused salt mixture prepared by reacting titanium tetrahalide and a molten reducing metal selected from the group consisting of alkali metal, alkaline earth metal and magnesium in stoichiometric proportions to form said fused salt mixture comprising a reducing metal halide and a lower valent titanium halide selected from the group consisting of titanium dihalide, titanium trihalide and mixtures thereof, said reaction for producing the fused salt mixture being carried out at a temperature above the melting point of said fused salt mixture.

7. In a method for producing titanium metal in which a reducing metal and a titanium compound are reacted with one another to form titanium metal and a reducing metal salt, the improvement which consists essentially of reacting titanium tetrachloride and a molten reducing metal selected from the group consisting of alkali, alkaline earth metal and magnesium in stoichiometric proportions to form a fused salt mixture comprising a reduced metal halide and a lower valent titanium halide selected from the group consisting of titanium dihalide, trihalide and mixtures thereof, said reaction for producing the fused salt mixture being carried out at a temperature above the melting point of said fused salt mixture and subsequently reacting said salt mixture with additional reducing metal in the stoichiometric proportions to form titanium metal and a reducing metal halide.

References Cited in the file of this patent

UNITED STATES PATENTS

| | | |
|---|---|---|
| 2,091,087 | Wempe | Aug. 24, 1937 |
| 2,205,854 | Kroll | June 25, 1940 |
| 2,607,674 | Winter | Aug. 19, 1952 |
| 2,618,549 | Glasser et al. | Nov. 18, 1952 |
| 2,631,941 | Cole | Mar. 17, 1953 |
| 2,647,826 | Jordan | Aug. 4, 1953 |
| 2,667,413 | Jordan | Jan. 26, 1954 |
| 2,676,882 | Hatch | Apr. 27, 1954 |

FOREIGN PATENTS

| | | |
|---|---|---|
| 717,930 | Great Britain | Nov. 3, 1954 |

OTHER REFERENCES

Comprehensive Treatise on Inorganic and Theoretical Chemistry by Mellor, vol. 7, 1927 ed. pp. 9, 10 and 81.

Trans. Faraday Society, vol. 32 (1936), pp. 633–642, inclusive.

The Chemistry of Titanium, Chem. Abstracts, vol. 31, pp. 4609–4610 (1937).

Zeitschrift für Anorganische und Allgemeine Chemie, vol. 234, 1937, pp. 42–50, pp. 43–44 pertinent.

Preprint 78–11, The Electrochemical Soc., pp. 161, 162, Oct. 7, 1940, entire report 12 pages.

Titanium, Report of Symposium, Dec. 16, 1948, Office of Naval Research, Wash., D. C., pages 20–21.

Metal Progress, February 1949, pp. 188–190.

U. S. Air Force Project Rand, Titanium and Titanium-Base Alloys, March 15, 1949, published by The Rand Corp., Santa Monica, Calif., pages 25–27.

Melting and Casting Zirconium Metal by Kroll et al., September 1949, pp. 158–169.

Bureau of Mines Report of Investigations R. I. 4519 by Wartman et al., pages 12, 13 and 14, entire report 37 pages. Published 1949 by Bur. of Mines, D. C.

Journal of Metals, April 1950, pp. 634–640.

Webster's New International Dictionary, 2nd ed. unabridged, page 1022.